(12) United States Patent
Spruit

(10) Patent No.: US 7,269,113 B2
(45) Date of Patent: Sep. 11, 2007

(54) POWER CORRECTION FOR DEVICE FOR SCANNING A RECORD CARRIER

(75) Inventor: Johannes Hendrikus Maria Spruit, Eindhoven (NL)

(73) Assignee: Koninklijke Phillips Electronics N.V., Eindhoven (NL)

( * ) Notice: Subject to any disclaimer, the term of this patent is extended or adjusted under 35 U.S.C. 154(b) by 463 days.

(21) Appl. No.: 10/502,522

(22) PCT Filed: Jan. 24, 2003

(86) PCT No.: PCT/IB03/00195

§ 371 (c)(1),
(2), (4) Date: Jul. 26, 2004

(87) PCT Pub. No.: WO03/065357

PCT Pub. Date: Aug. 7, 2003

(65) Prior Publication Data

US 2005/0147010 A1    Jul. 7, 2005

(30) Foreign Application Priority Data

Jan. 28, 2002    (EP) .................................. 02075376

(51) Int. Cl.
*G11B 11/00*    (2006.01)

(52) U.S. Cl. ................................. 369/53.33; 369/47.17
(58) Field of Classification Search .................... None
See application file for complete search history.

(56) References Cited

U.S. PATENT DOCUMENTS

| 5,303,217 A | 4/1994 | Bakx et al. |
| 5,739,521 A | 4/1998 | Lee |
| 5,903,537 A | 5/1999 | Gage et al. |

FOREIGN PATENT DOCUMENTS

| JP | 04117634 | 4/1992 |
| JP | 2001312822 | 11/2001 |

*Primary Examiner*—Paul W. Huber
(74) *Attorney, Agent, or Firm*—Michael E. Belk

(57) ABSTRACT

A device for recording and/or reading a record carrier has an optical head with a laser for generating a beam via a scanning spot on a track of the carrier. A detector detects a read signal and a sensor detects a sense signal from the beam. A control unit controls the laser power to a desired value. A correction unit generates a correction signal that depends on local optical properties of the record carrier derived from the sense signal measured on at least one part of the track near the scanning spot. The device corrects the power control using the correction signal. Furthermore, the record carrier can have prerecorded control parameters for setting the correction unit.

7 Claims, 4 Drawing Sheets

POWER CORRECTION FOR DEVICE FOR SCANNING A RECORD CARRIER

Figure 1:
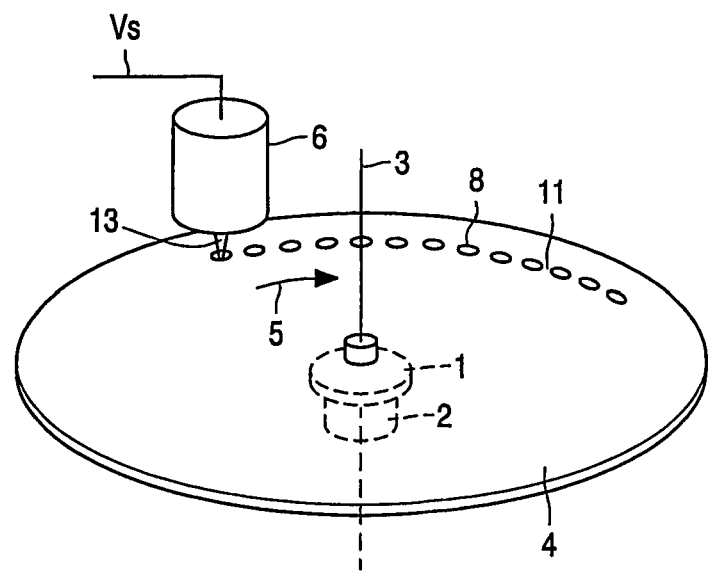

This application is a 371 of PCT/IB03/00195, filed Jan. 24, 2003.

The invention relates to a device for scanning a record carrier having a track for recording information represented by marks, the device comprising a scanning unit comprising a radiation source and optical elements for generating a beam of radiation from the radiation source via a scanning spot on the track to a detector for detecting at least one read signal, a sensor for detecting a sense signal from the beam, and a control unit for controlling the radiation source power to a desired value in dependence on the sense signal.

The invention also relates to a method of generating signals from a detector during the scanning of a track on a record carrier via a beam of radiation from a radiation source via a scanning spot on the track to the detector, the track being for recording information represented by marks, the method comprising detecting a sense signal from the beam via a sensor, and controlling the radiation source power to a desired value in dependence on the sense signal.

The invention also relates to a method of controlling the power of a radiation source, in particular a laser, during the recording of information.

The invention also relates to a record carrier of a recordable type having a track for recording information represented by marks, the record carrier comprising prerecorded control information for controlling the recording process.

A record carrier, a method and an apparatus for scanning the record carrier are known from U.S. Pat. No. 5,303,217 (PHN12994). The record carrier has a track for recording information represented by marks, e.g. a spiral shaped track on a disc shaped carrier indicated by a wobbled pregroove. The marks have different lengths and are recorded in the track by applying radiation from a radiation source, in particular a laser, to a recording layer, e.g. a dye like in CD-Recordable. The device comprises a scanning unit that has a laser and optical elements for generating a beam of radiation from the laser via a scanning spot on the track to a detector for detecting a read signal. The device comprises a drive unit for rotating the record carrier. For scanning the track an optical head constituted by said elements is positioned opposite the track by a positioning unit while the record carrier is rotated. The device comprises a sensor for detecting a sense signal from the beam, and a control unit for controlling the laser power to a desired value in dependence on the sense signal. The sensor is a monitor diode receiving part of the radiation beam generated by the laser. Furthermore, the control unit comprises a calculation unit for calculating an asymmetry signal based on the positive and negative peak values of the read signal relative to a DC signal. The asymmetry signal is a measure of the correspondence of the marks to desired lengths thereof.

The desired value of the laser power is set in dependence on the asymmetry signal for generating recorded marks and intermediate unrecorded lands having a predefined ratio of lengths, said ratio being equal to the ratio of the signal representing the information. When reproducing such a disc the detected signals are expected to have such ratio. A problem is that, when the record carrier is reproduced, detected signals may deviate from the expected values.

It is an object of the invention to provide a scanning device and corresponding methods for achieving detected signals that correspond better to the expected values.

For this purpose, the device as described in the opening paragraph is characterized in that the device comprises measuring means for generating a correction signal indicative of local optical properties of the record carrier in dependence on at least one sense signal measured on at least one part of the track near the scanning spot, and correction means for correcting at least one of said detected signals in dependence on the correction signal. The method as described in the opening paragraph is characterized in that the method comprises generating a correction signal indicative of local optical properties of the record carrier in dependence on at least one sense signal measured on at least one part of the track near the scanning spot, and correcting at least one of said detected signals in dependence on the correction signal. The record carrier as described in the opening paragraph is characterized in that the control information comprises at least one parameter indicative of a type of correction to be used for correcting local optical properties of the record carrier in dependence on at least one sense signal measured on at least one part of the track near a scanning spot.

The invention is based on the recognition of the following facts. First the inventors have seen that the deviation of the detected signals during reproduction is caused by an incorrect setting of the power during recording. For example, although the power of the radiation source during recording is controlled to a desired value based on a measurement of the asymmetry, the resultant record carrier proves to have a deviating asymmetry. Secondly, the inventors have seen that the detected signals deviate due to unexpected variations of the laser power. The variations of the laser power are caused by local optical properties of the record carrier, which prove to be not constant across the record carrier. For example, the local optical properties may cause optical feedback of radiation reflected from the record carrier back into the laser, which increases the laser power. Thirdly, the inventors have seen that the sense signal, when measured at selected parts of the tracks, has a component indicative of the local optical properties, and that a correction signal is derivable from the sense signal. The correction signal is used to correct the detected signals.

In an embodiment of the device the measuring means comprise means for generating an empty value FSE by detecting the sense signal when reading a part of the track having no marks, and a written value FSW by detecting the sense signal when reading a part of the track having marks, and means for combining the empty value and the written value in order to generate the correction signal. The effect is that the local optical properties have a different effect on the sense signal of an empty track and the sense signal of a written track. The correction signal, therefore, has a corrective component based on said difference.

Figure 2:
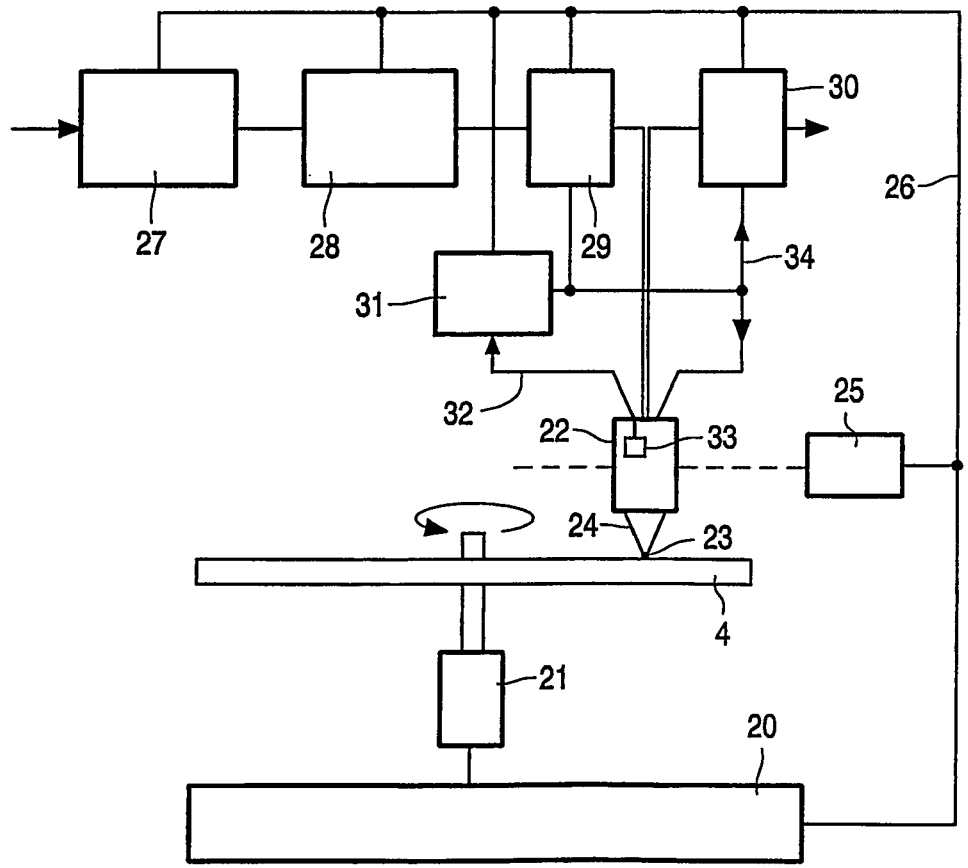
Figure 3A:
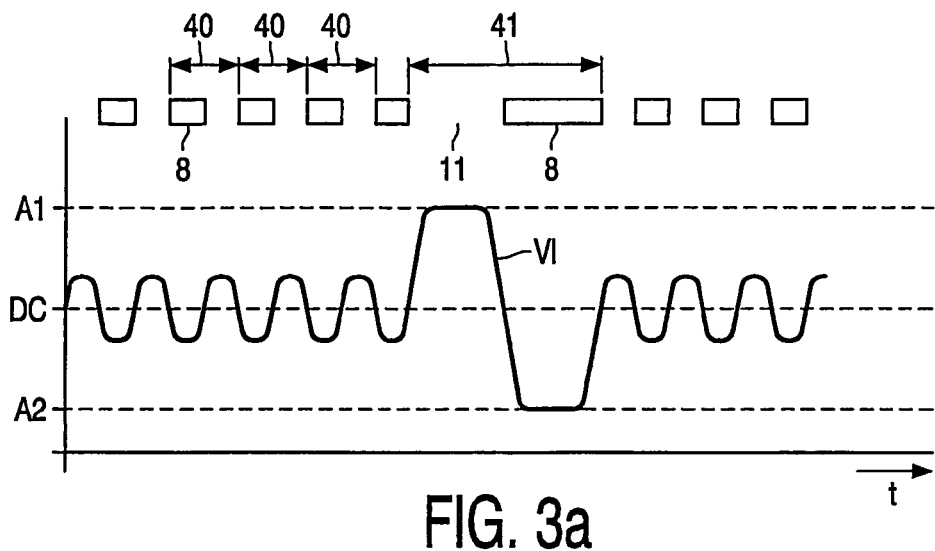
Figure 3B:
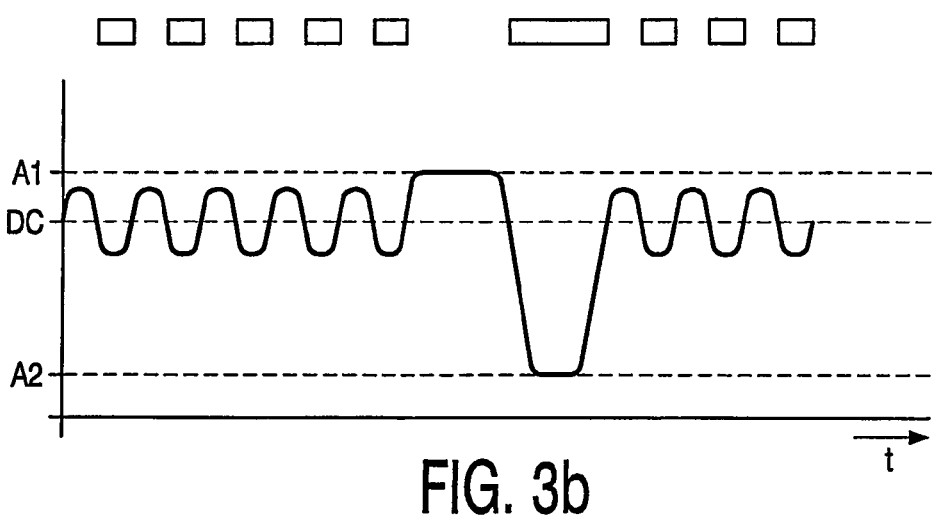
Figure 3C:
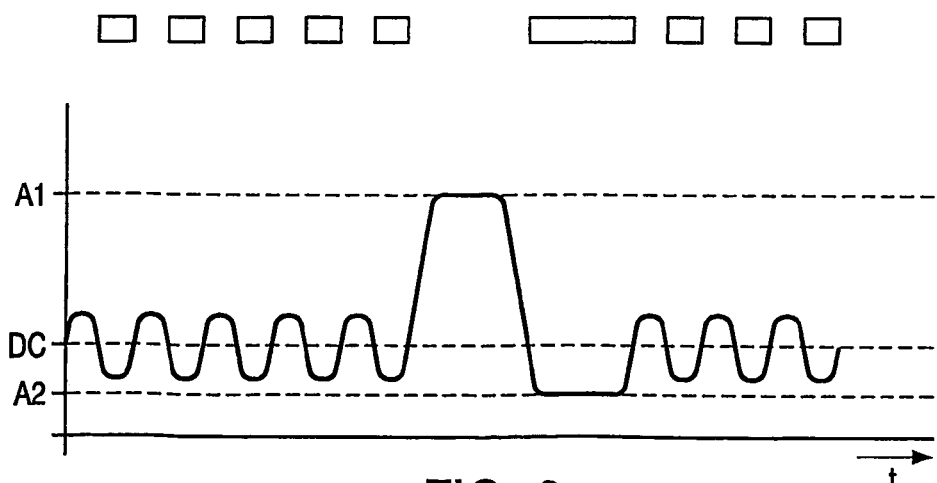
Figure 4:
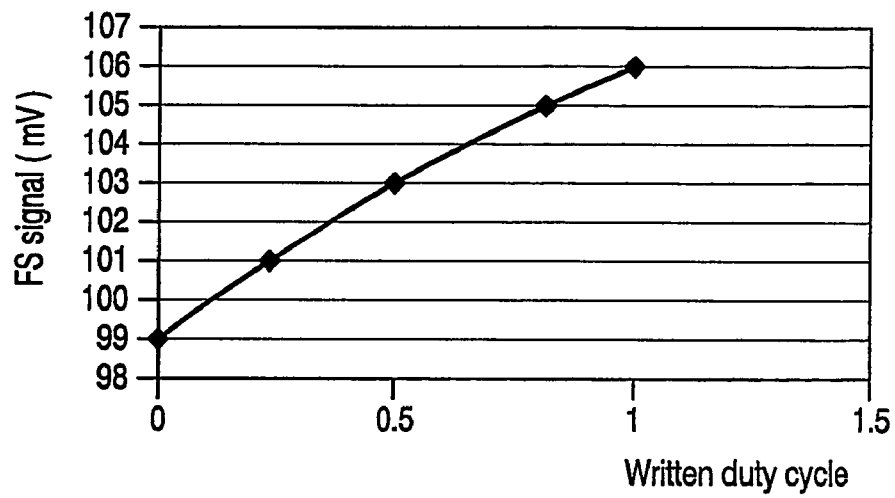
Figure 7:
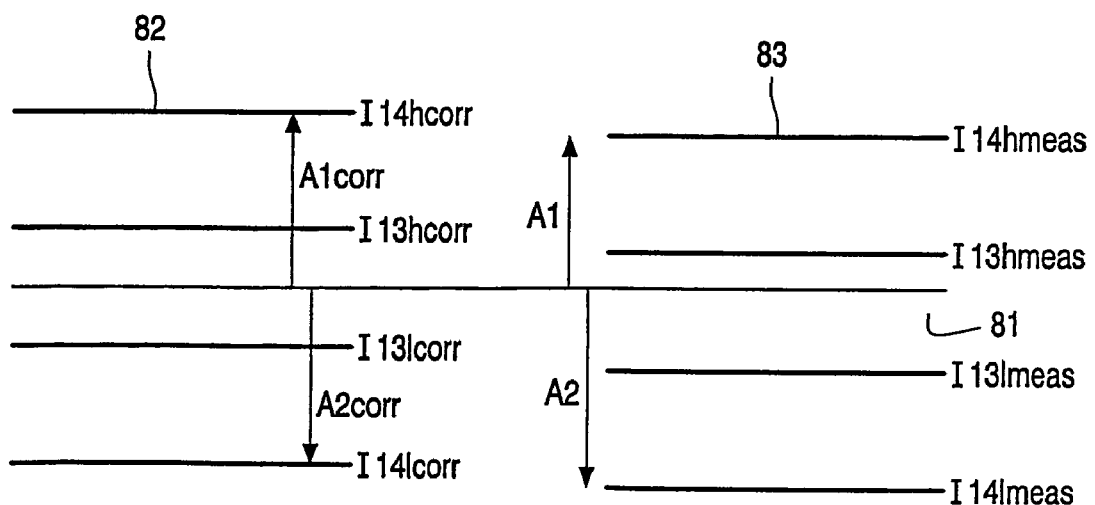
Figure 5:
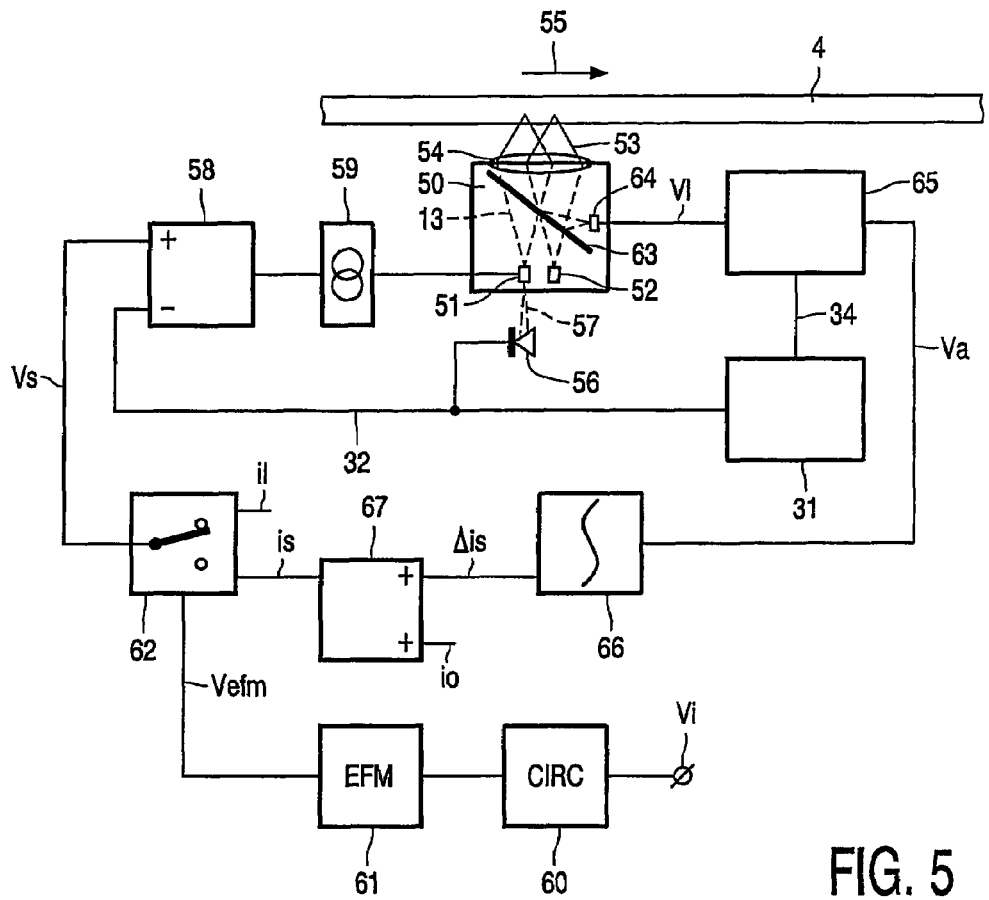
Figure 6:
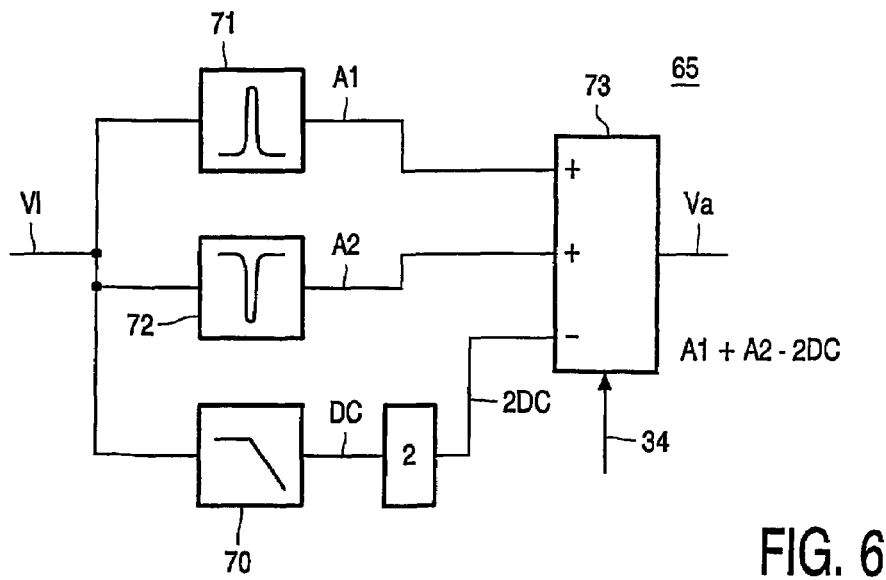

These and other aspects of the invention will be apparent from and elucidated with reference to the embodiments described, by way of example, in the following description and with reference to the accompanying drawings, in which FIG. 1 shows diagrammatically a customary optical recording device, FIG. 2 shows a scanning device, FIG. 3 illustrates the relationship between recorded information patterns and the associated read signals to clarify the invention, FIG. 4 shows the forward sense signal as a function of written duty cycle, FIG. 5 shows the laser control of a recording device FIG. 6 shows an analysis circuit for calculating an asymmetry signal, and FIG. 7 shows measured and corrected values of detected signals.

FIG. 1 shows diagrammatically an optical recording device, comprising a turntable 1 and a drive motor 2 for rotating a disc shaped record carrier 4 about an axis 3 in a direction indicated by an arrow 5. The record carrier 4 comprises a radiation-sensitive recording layer which upon exposure to radiation of sufficiently high intensity is subjected to an optically detectable change, such as, for example, a change in reflectivity, for forming marks representing information. Such a radiation-sensitive layer may comprise, for example, a thin metal layer which can be removed locally by exposure to a laser beam of comparatively high intensity. Alternatively, the recording layer may consist of another material such as a radiation sensitive dye or a phase-change material whose structure can be changed from amorphous to crystalline or vice versa under the influence of radiation. The record carrier comprises a track 11 for recording the marks, the track being indicated by a servo pattern for generating servo tracking signals for positioning an optical head opposite the track. The servo pattern may, for example, be a shallow wobbled groove, usually called a pre-groove, and/or a pattern of indentations, usually called pre-pits or servo pits. An optical write head 6 is arranged opposite the rotating record carrier. The optical write head 6 comprises a radiation source, for example, a solid-state laser, for generating a write beam 13. The intensity I of the write beam 13 can be modulated in conformity with a control signal Vs in a customary manner. The intensity I of the write beam 13 varies between a write intensity Iw, which is adequate to bring about detectable changes in the optical properties of the radiation-sensitive record carrier, and an intensity In which does not bring about any detectable changes. In alternative embodiments of the device more sophisticated write strategies are implemented, e.g. controlling the write power in dependence on the length of the mark to be written. When the recording layer is scanned with the beam 13 whose intensity is thus modulated, an information pattern of recording areas 8 having modified optical properties is formed in the recording layer, which recording areas alternate with intermediate areas having unmodified optical properties. An information pattern thus formed can be read by scanning the pattern with a read beam of a constant intensity which is low enough to preclude a detectable change in optical properties. During scanning the read beam reflected from the record carrier is modulated in conformity with the information pattern being scanned. The modulation of the read beam can be detected in a customary manner by means of a radiation-sensitive detector which generates a read signal which is indicative of the beam modulation.

FIG. 2 shows a scanning device for writing and/or reading information on a record carrier 4 of a type which is writable or re-writable, for example, CD-R or CD-RW. The device is provided with scanning means for scanning the track on the record carrier, which means include a drive unit 21 for rotating the record carrier 4, a scanning unit 22 comprising an optical head and additional circuitry, a positioning unit 25 for coarsely positioning the optical head in the radial direction on the track, and a control unit 20. The optical head comprises an optical system of a known type for generating a radiation beam 24 guided through optical elements focused to a radiation spot 23 on a track of the information layer of the record carrier. The optical head and additional circuits constitute a scanning unit for generating signals detected from the radiation beam. The radiation beam 24 is generated by a radiation source, e.g. a laser diode. The optical head comprises a sensor 33 for detecting a sense signal 32 from the radiation beam. The head also comprises (not shown) a focusing actuator for moving the focus of the radiation beam 24 along the optical axis of said beam and a tracking actuator for the fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the optical head for generating a read signal and further detector signals including a tracking error and a focusing error signal for controlling said tracking and focusing actuators. The read signal is processed by a read processing unit 30 of a usual type which includes a demodulator, deformatter and output unit to retrieve the information. Hence retrieving means for reading information include the drive unit 21, the optical head, the positioning unit 25 and the read processing unit 30. The device comprises write processing means for processing the input information to generate a write signal to drive the optical head, which means comprise an input unit 27, and modulator means comprising a formatter 28 and a modulator 29. The control unit 20 controls the recording and retrieving of information and may be arranged for receiving commands from a user or from a host computer. The control unit 20 is connected, via control lines 26, for example, a system bus, to said input unit 27, formatter 28 and modulator 29, to the read processing unit 30, and to the drive unit 21 and the positioning unit 25. The control unit 20 comprises control circuitry, for example, a microprocessor, a program memory and control gates, for performing the writing and/or reading functions. The control unit 20 may also be implemented as a state machine in logic circuits. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings which are obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. User information is presented on the input unit 27, which may comprise compression means for input signals such as analog audio and/or video or digital uncompressed audio/video. Suitable compression means are described for audio in WO 98/16014-A1 (PHN 16452) and for video in the MPEG2 standard. The input unit 27 processes the audio and/or video to units of information which are passed to the formatter 28 for adding control data and formatting the data according to the recording format, e.g. by adding error correction codes (ECC) and/or interleaving. For computer applications units of information may be interfaced to the formatter 28 directly. The formatted data from the output of the formatter 28 is passed to the modulation unit 29, which comprises, for example, a channel coder, for generating a modulated signal which drives the optical head. Furthermore, the modulation unit 29 comprises synchronizing means for including synchronizing patterns in the modulated signal. The formatted units presented to the input of the modulation unit 29 comprise address information and are written to corresponding addressable locations on the record carrier under the control of the control unit 20. The device also comprises a correction unit 31 for generating a correction signal 34 indicative of local optical properties of the record carrier. The sense signal 32 is input to the correction unit 31. The correction signal 34 is connected to the modulation unit 29 for correcting the write signal and/or to the scanning unit for correcting the detected signal and/or to the read processing unit 30 to correct the read signal. For example, a track cross signal, which is one of the signals from the scanning unit generated during a jump of the optical head to a different track, can be corrected to a corrected track cross signal which more reliably indicates the tracks crossed. The correction unit 31 is arranged for measuring the sense signal on at least one part of the track near the scanning spot as described hereinafter.

FIG. 3 illustrates the relationship between recorded information patterns and the associated read signals to clarify the invention. FIG. 3a shows information patterns that have been recorded with an optimum write intensity. Similar information patterns are shown in FIGS. 3b and 3c, which have been recorded with a write level which is too low and too high, respectively. As will be apparent from FIG. 3, the level DC in the case of the optimum write intensity is situated substantially in the middle between the maximum signal value (A1) and the minimum signal value (A2) in the read signal V1, while in the case of a write level which is too low or too high, the level DC is situated above and below said middle, respectively. The information pattern shown in FIG. 3 is only one of the possible information patterns comprising a comparatively large number of subpatterns consisting of short areas, i.e. marks (8) and intermediate areas, and a comparatively small number of subpatterns consisting of long areas. A subpattern which is also very suitable is a pattern corresponding to a standard EFM signal. Such a pattern comprises areas of a length corresponding to at least 3 bits (I3-effect) and at the most 11 bits (I11 effect). Approximately one third of all the effects in such an EFM pattern are I3 effects, whereas only 4% of all the effects are I11 effects. The dimensions of the I3 effects are such that only the fundamental of these effects is situated below the optical cut-off frequency of the optical read system. Of the I11 effects also higher harmonics are situated below the optical cutoff frequency. Therefore, a different response can be expected for I3 and I11.

In the device the optimum write power should be set before starting recording. In order to set this write power properly, an Optimum Power Control (OPC) procedure is carried out. For CD-R and DVD+/−R systems a so-called β OPC procedure is defined. In this procedure the parameter β, which is a measure for the asymmetry, is determined as a function of laser power. The calculation of β and circuitry for determining β are described in detail in U.S. Pat. No. 5,303,217. The value of β is based on the values A1 and A2 (see FIG. 3 above and note that A2 is a negative value below DC level) as follows: $\beta=(A1+A2)/(A1-A2)$. In alternative embodiments a different definition of the asymmetry signal is used. In an embodiment of the record carrier the optimum β value is indicated and at a certain laser power the measured β will be identical to the value as indicated in the disk (yielding best write performance). By setting the desired value for the write power so as to achieve this value, the optimum asymmetry for the best writing condition is obtained. Crucial for a good OPC result is a reliable measurement of the parameter β. It has been found that in practical situations the measurement of β deviates from the actual value of β. For instance a disk is written in a writer and the asymmetry is controlled to be constant by the β parameter. After writing, the disk is read back in another writer or reader. Measurements have shown that in read back in the other systems the asymmetry across the disk is far from constant. This means that while in the original writer it is assumed that a constant asymmetry is written, in practice this is not the case. Now it has been seen that a measurement error in β occurs.

In an embodiment of the device the measurement error in β is corrected as follows. The laser power is monitored using a forward sense diode in different situations. It appears that the amount of laser light varies in dependence on the radius and the written situation of the disk. These variations are most likely caused by both birefringence and depolarization effects of the written marks. The birefringence varies as a function of radius on the same disk. From the birefringence one can expect some feedback of light to the laser. Feedback of light into the laser increases the light output of the laser. The light output power also appears in the forward sense signal. In an experiment using a partly recorded disc, the relation was visible for an empty track. On the written groove a laser output is seen, which is higher than on the empty track, while from the feedback of laser light a lower output is expected, because the written groove reflection is lower than the empty track reflection. The relation with birefringence is not very clear, but the reason for this higher power level may be due to depolarization effects caused by the written marks. Hence the laser output varies as a function of the written state of the disk. In the experiment the variations were small at the inner diameter and large at the outer diameter. The optical feedback mechanisms causing a changing laser output are very fast, so during read back of the information marks the laser will be modulated in intensity as well. Therefore, measurement errors in the asymmetry will occur as well. In the experiment the measurement errors in the asymmetry are small at the inner diameter. Here the variations in laser output are small, so no measurement error occurs. In the experiment, the variations in asymmetry are large at the outer diameter and the variations in laser output are also large, thus resulting in the measurement errors.

From drive to drive there will be a different sensitivity for laser feedback, causing different errors in the measured asymmetry. When the feedback is measured using the sense signal, the β measurement errors can be predicted. In a drive this can be determined by, for example, looking at the forward sense signal during reading an empty track versus the forward sense signal during reading a written track. The difference between those measured forward sense signals gives a measure of the error in β. During the measurements the laser output should not be controlled to be constant. Alternatively, the laser power may be controlled to be constant and the laser control parameters may be used as a measure. The difference between land forward sense signal and groove forward sense signal in a written area may also yield such a measure.

FIG. 4 shows the forward sense signal as a function of written duty cycle. The value of the forward sense signal is shown along the y-axis and the duty cycle of the written marks is shown along the x-axis. The laser output versus written duty cycle of the HF has been measured and proves to be roughly linear. A duty cycle of 0 corresponds to a completely empty track, while a duty cycle of 1 corresponds to a track written with an "infinitely" long mark. Duty cycle 0.21 corresponds to a track with I3 marks in between I11 spaces, while duty cycle 0.79 corresponds to a track with I11 marks in between I3 spaces. For a duty cycle of 0.5 both I3-I3 as well as I11-I11 patterns were written, both yielding the same result. The results show that as a rough estimation a linear behavior can be assumed. For correcting the value of β a model is needed to translate the measurements of the sense signal. The measurements show that a linear model is suitable for this type of record carrier. Hence for correction a linear model is used. It is to be noted that the measured values of the sense signal differ in dependence on the local optical properties of the record carrier, e.g. the birefringence. Hence a local measurement near the position where the scanning spot has to write new marks is performed so as to obtain the actual correction values.

In an embodiment of the recording device the recording process is interrupted often because the device has to wait for new data to arrive, e.g. in the case of encoding video data. The parameter β is measured in a so-called 'walking OPC' method. In this method write power control during writing of the disk is performed by measuring β each time when a certain portion of the disk is written. In case β deviates from the desired value, the write power is adjusted in order to obtain best β again. During such interruptions the idle time is used to perform a measurement of the local optical properties by detecting the sense signal in a few suitable parts of the track, e.g. a written part and an empty part. In this way the local optical properties can be corrected in any location of the record carrier.

In an embodiment of the record carrier control information is prerecorded for controlling the recording process. For example, the control information is encoded in the servo pattern, e.g. in the wobble or the pre-pits, or in an area of the disc which has pre-recorded information. For applying the correction as described above at least one parameter is included in the control information indicating the type of correction. For example, a correction model to be used is indicated on the record carrier by the control parameter. Other correction parameters may also be included in the control information on the record carrier to adjust the correction to the specific record carrier, e.g. a factor indicative of the change of reflectivity between an empty and a written groove. In an embodiment of the device a varying correction model is used, taking into account deviations of the linear model for other types of record carriers, e.g. a model or a correction factor indicated on the record carrier as a control parameter.

FIG. 5 shows the laser control of a recording device. The recording device comprises an optical head 50 with a first semiconductor laser 51 for generating the write beam 13. The device has a second semiconductor laser 52 for generating a second beam 53 of a different laser light wavelength, e.g. the first laser 51 having the wavelength for CD and the second laser having the wavelength for DVD. The second write beam 53 is controlled, similar to the first write beam 13, in dependence of the type of the record carrier. Further parts of the DVD circuitry of the device are not shown in the Figure and the description of the CD elements applies also to corresponding DVD elements. The write beam 13 is directed to the record carrier 4 by means of an optical system comprising an objective 54, which record carrier is moved past the optical head 50 in the direction indicated by an arrow 55. This is effected in a customary manner. The intensity I of the write beam 13 is controlled to assume a value dictated by the signal Vs. For this purpose the recording device comprises a radiation-sensitive diode 56 which is arranged to detect part 57 of the beam 13 which issues from the back of the semiconductor laser 51 and has an intensity proportional to that of the write beam. The radiation-sensitive diode 56 then produces a sense signal 32 proportional to the detected intensity. The signal Vs and said signal current are compared with each other in a comparator circuit 58. A signal which is indicative of the result of the comparison is applied to a controllable current source 59, which generates a control current for the semiconductor laser 51 in such a way that the signal current produced by the diode 56, and hence the intensity of the write beam 13, is controlled to assume the value dictated by the write signal Vs. The recording device also comprises a cascade arrangement of a conventional CIRC encoding circuit 60 and an EFM modulator 61 for converting an applied information signal Vi into an EFM signal Vefm modulated in conformity with the CD standard. The signal Vefm is applied to a control input of a controllable switch 62 of a type which transfers one of the two inputs signals is or il to its output in dependence on the logic value of the signal applied to its control input. The signal on the output of the switch 62 is applied to the comparator circuit 58 as the signal Vs. The signal is defines the desired write intensity Is and the signal I1 defines a low intensity not affecting the recording layer. An information pattern representing the signal Vi is recorded as follows. The CIRC encoding circuit 60 and the EFM modulator 61 convert the signal Vi into an EFM modulated bivalent signal Vefm. This signal controls the switch 62 in such a way that the signals il and is are alternately applied to the comparator circuit 58, as a result of which the intensity of the write beam is switched between the write intensity Is defined by this signal is and the intensity Il defined by the signal il, so that an information pattern corresponding to the signal Vefm is recorded on the record carrier. For reading a beam with a low intensity is generated and is reflected from the record carrier 4, the reflected beam being modulated in conformity with the information pattern being scanned. The read beam thus modulated is directed to a radiation-sensitive detector 64 via a semitransparent mirror 63, which detector generates a read signal V1 which is indicative of the beam modulation. The read signal V1 is applied to an analysis circuit 65 which generates a signal Va which indicates the extent to which the d.c. level DC deviates from the value corresponding to the optimum write intensity. The signal Va is applied to an integrating circuit 66. An output signal Δis of the integrating circuit is applied to an input of an adder circuit 67. A signal io, corresponding to a constant intensity, is applied to the other input of the adder circuit 67. An output signal which is indicative of the sum of the signal io and the signal Δis is applied to the switch 62 as the signal is. If in the recording device shown in FIG. 5 the write intensity Is deviates from the optimum value, this will be indicated by the analysis signal Va in that it has a non-zero signal value. As a result, the signal Δis on the output of the integrating circuit 66 will change, so that the write intensity Is is controlled towards the optimum value. This results in continuous control of the write intensity Is so as to maintain the write intensity Is substantially at the optimum value. The device comprises a correction unit 31 receiving the sense signal 32 as input. The correction circuit 31 calculates a correction signal 34 for correcting the measured values of the read signal V1 as described below.

An embodiment of the device comprises a forward sense diode as the sensor for generating the sense signal 34, which sensor is positioned in the optical head 50 beside the main optical axis of the beam, thus receiving a part of the beam 13 or the second beam 53, which part would not be entering the further optical elements, e.g. the objective lens. Such a forward sense diode provides a more accurate measurement (compared to a monitor diode) of the actual laser power of the beam as directed to the record carrier. It is to be noted that the forward sense diodes used are relatively large and, therefore, too slow to respond to changes of the intensity of the beam caused by individual marks. In an embodiment a small and fast diode is used as an additional sensor. Using such a sensor, the optical output power of the laser is either kept constant by controlling the electrical power in a fast control loop or the variations are measured and the corrections are based on the fast measurements.

FIG. 6 shows an analysis circuit for calculating an asymmetry signal. The analysis circuit comprises a low-pass filter 70 for determining the d.c. level DC in the read signal VI. The analysis circuit 65 also comprises a positive-peak detector 71 for determining the maximum value A1 in the read signal I and a negative-peak detector 72 for determining the minimum value A2 in the read signal VI. The output signals of the peak detectors 71 and 72 are applied to non-inverting inputs of an adder circuit 73, while the output signal of the low-pass filter 70, after having been amplified to twice its value, is applied to an inverting input of the adder circuit 73, so that the output signal of the adder circuit 73, which signal constitutes the analysis signal Va, is equal to Va=A1+A2−2DC and, consequently, indicates the extent to which the position of the signal value DC deviates from the desired value, e.g. the middle between the maximum signal value A1 and the minimum signal value A2. The adder circuit 73 has a further input for adding a correction signal 34 to the measured values of A1 and A2.

FIG. 7 shows measured and corrected values of detected signals. In the middle of the Figure a DC level 81 in the measured and corrected condition is drawn at the same level. The left part of the Figure shows an example of actual signal levels 82 as corrected according to the invention; in top-down order the signal values I14hcorr, I3hcorr, DC level 81, I31corr and I141corr are given. The right part shows an example of the same signals, but now the measured levels 83; in top-down order the signal values I14hmeas, I3hmeas, DC level 81, I31meas and I141meas are given. The level calculated by (I3h+I31)/2 is the reference DC level 81. The actual signal levels A1corr and A2corr are the result of correcting the measured values A1 and A2 as follows. Due to the decrease in laser power when measuring the I14h level, the level I14hmeas is measured too low in such a situation. So, this value should be corrected to a higher value. The sense signal as measured on a written (FSW) and empty (FSE) track can be used for this purpose. In devices described above A1 and A2 values are measured; it is to be noted that A2 is negative. The A1 and A2 values are to be corrected as follows:

$A1corr = A1*(1+((FSW-FSE)/FSW))$ $A2corr = A2*(1+((FSW-FSE)/FSW)*A2/A1)$

The corrected value for β can thus be obtained:

$βcorr = (A1corr+A2corr)/(A1corr-A2corr)$.

After correction, the β values are much closer to the actual β values. This is one example of correcting the practical β value. More sophisticated methods, for example, taking non-linear effects into account, can also be used. The method of correcting a measured asymmetry (β) by using (for instance) the forward sense diode signal in case of written and non-written tracks can be applied especially in CD-R and DVD+/−R systems. Measurement errors due to laser power variations may also occur in the gamma OPC procedure in CD-RW and DVD+/−RW. However, due to the smaller reflection/depolarization effects on these media, measurement errors may be smaller.

Although the invention has been explained mainly on the basis of embodiments using the CD-R, similar embodiments are suitable for other optical recording systems like DVD-R or DVD+RW. Furthermore, an optical disc has been described for the information carrier, but other media, such as a magnetic disc or tape, may also be used. It is to be noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Furthermore, the scope of the invention is not limited to the embodiments, and the invention lies in each and every novel feature or combination of features described above.

The invention claimed is:

1. A device for scanning a record carrier having a track for recording information represented by marks, the device comprising:
    a scanning unit comprising a radiation source and optical elements for generating a beam of radiation from the radiation source via a scanning spot on the track to a detector for detecting at least one read signal, the scanning unit further comprising means for generating an asymmetry signal β based on a read signal from the detector when scanning a part of the track comprising marks, the asymmetry signal β being a measure of correspondence of the marks to desired lengths thereof,
    a sensor for detecting a sense signal from the beam,
    a control unit for controlling radiation source power of the radiation source to a desired value in dependence on the sense signal, and
    correction means for generating a correction signal indicative of local optical properties of the record carrier in dependence on at least one sense signal measured on at least one part of the track near the scanning spot, and for correcting at least one of said detected signals in dependence on the correction signal,
    wherein the correction means are coupled to the control unit for correcting the desired value of the radiation source power, and
    wherein the asymmetry signal β is generated by:
        measuring a positive peak level A1 and a negative peak level A2 relative to a DC level of the read signal,
        correcting the positive peak level A1 of the read signal to A1' by a first correction calculation in dependence on the correction signal,
        correcting the negative peak level A2 of the read signal to A2' by a second correction calculation independence on the correction signal, and
        calculating the asymmetry signal β as $β=(A1'+A2')/(A1'-A2')$.

2. The device as claimed in claim 1, wherein the correction means comprise means for selecting said part of the track such that the measured sense signal has a component indicative of the local birefringence or de-polarizing effects of the record carrier as local optical properties.

3. The device as claimed in claim 1, wherein the correction means comprise means for generating an empty value FSE by detecting the sense signal when reading a part of the track having no marks, and a written value FSW by detecting the sense signal when reading a part of the track having marks, and means for combining the empty value and the written value in order to generate the correction signal.

4. The device as claimed in claim 1, wherein the measuring means comprise means f or generating an empty value FSE by detecting the sense signal when reading a part of the track having no marks, and a written value FSW by detecting the sense signal when reading a part of the track having marks, and $$A1'=A1*(1+((FSW-FSE)/FSW)), \text{ and}$$

$$A2'=A2*(1+((FSW-FSE)/FSW)\times A2/A1).$$

5. The device as claimed in claim 1, wherein the sensor is a forward sense diode for detecting radiation from a part of the beam as reflected from the record carrier.

6. A method of generating signals from a detector during the scanning of a track on a record carrier via a beam of radiation from a radiation source via a scanning spot on the track to the detector, the track being for recording information represented by marks, the method comprising the acts of:

detecting a sense signal from the beam via a sensor, controlling a radiation source power of the radiation source to a desired value in dependence on the sense signal, generating an asymmetry signal β based on a read signal when scanning a part of the track comprising marks, the asymmetry signal β being a measure of correspondence of the marks to desired lengths thereof, generating a correction signal using the asymmetry signal β and indicative of local optical properties of the record carrier in dependence on at least one sense signal measured on at least one part of the track near the scanning spot, and correcting at least one of said detected signals in dependence on the correction signal, wherein the asymmetry signal β is generated by the acts of:

measuring a positive peak level A1 and a negative peak level A2 relative to a DC level of the read signal, correcting the positive peak level A1 of the read signal to A1' by a first correction calculation in dependence on the correction signal, correcting the negative peak level A2 of the read signal to A2' by a second correction calculation independence on the correction signal, and calculating the asymmetry signal β as β=(A1'+A2')/(A1'−A2').

7. A method of controlling the power of a radiation source, during recording of information represented by marks in a track on a record carrier via a beam of radiation from the radiation source via a scanning spot on the track to a detector, the method comprising the acts of:

detecting a sense signal from the beam via a sensor, generating an asymmetry signal β based on a read signal when scanning a part of the track comprising marks, the asymmetry signal β being a measure of correspondence of the marks to desired lengths thereof, controlling power of the radiation source to a desired value in dependence on the sense signal, correcting the desired value in dependence on a correction signal related to the asymmetry signal β and indicative of local optical properties of the record carrier in dependence on at least one sense signal measured on at least one part of the track near the scanning spot, wherein the asymmetry signal 13 is generated by the acts of:

measuring a positive peak level A1 and a negative peak level A2 relative to a DC level of the read signal, correcting the positive peak level A1 of the read signal to A1' by a first correction calculation in dependence on the correction signal, correcting the negative peak level A2 of the read signal to A1' by a second correction calculation independence on the correction signal, and calculating the asymmetry signal β as β=(A1'+A2')/(A1'−A2').

* * * * *